United States Patent [19]

Sweder

[11] Patent Number: 4,917,130
[45] Date of Patent: Apr. 17, 1990

[54] MAKE-UP COMPACT FOR MOUNTING ON A STEERING WHEEL

[76] Inventor: John J. Sweder, Thunderbird Motor Lodge, Route 2A #118, 299, Luxenberg, Fitchburg, Mass. 01420

[21] Appl. No.: 248,992

[22] Filed: Sep. 26, 1988

[51] Int. Cl.⁴ .............................................. A45D 42/10
[52] U.S. Cl. .................................... 132/288; 132/286; 224/276
[58] Field of Search ................ 132/286, 288; 224/276, 224/278; 40/593, 904

[56] References Cited

U.S. PATENT DOCUMENTS

| | | | |
|---|---|---|---|
| D. 64,107 | 2/1924 | Dowell | D28/78 |
| D. 85,403 | 10/1931 | Swanson | D28/78 |
| D. 275,425 | 9/1984 | Briggs | D28/78 |
| 1,027,362 | 5/1912 | Strong | 132/286 |
| 1,530,162 | 3/1925 | Foreman | 224/276 |
| 1,865,241 | 6/1932 | Dock | 224/277 |
| 1,892,721 | 1/1933 | Cardarelli | 248/447.2 |
| 2,141,849 | 12/1938 | Baer | 248/447.2 |
| 2,150,709 | 3/1939 | Bake | 224/276 |
| 2,487,883 | 11/1949 | LeBaron | 132/288 |
| 2,490,352 | 12/1949 | Hahn et al. | 132/288 |
| 2,603,893 | 7/1952 | Bennett | 224/276 |
| 2,680,325 | 6/1954 | Berman | 248/447.2 |
| 3,619,596 | 11/1971 | Jackson | 132/288 |
| 3,952,988 | 4/1976 | Easterly | 248/447.1 |

*Primary Examiner*—John J. Wilson
*Assistant Examiner*—Michael Lynch
*Attorney, Agent, or Firm*—Jerry T. Kearns

[57] ABSTRACT

A make up compact is removably secured by cooperating VELCRO fasteners to a resilient U-shaped spring clip adapted for removable securement to a vehicle steering wheel. Electric lights may be provided adjacent the compact mirror for connection by an adaptor cord to the vehicle cigarette lighter socket. A ball and socket pivot connection may be utilized to secure the compact for adjustment relative to the resilient spring clip. A pair of spaced spring clips may be provided to inhibit movement of the compact relative to the steering wheel.

1 Claim, 5 Drawing Sheets

MAKE-UP COMPACT FOR MOUNTING ON A STEERING WHEEL

BACKGROUND OF THE INVENTION

1. Field of the Invention

The present invention relates to make up compacts, and more particularly pertains to a new and improved make up compact adapted to be removably attached to a vehicle steering wheel. Many women apply make up by utilizing the vehicle rear view mirror while driving in traffic on their way to work each morning. A large number of accidents have resulted from this practice. In order to make this inherently hazardous practice safer, the present invention provides a make up compact adapted to be secured in a woman driver's line of sight on a top portion of a vehicle steering wheel. Additionally, by securing the make up compact to the vehicle steering wheel, one of the woman's hands is freed for driving the vehicle.

2. Description of the Prior Art

Various types of make up compacts are known in the prior art. A typical example of such a make up compact is to be found in U.S. Design Pat. No. 64,107, which issued to B. Dowell on Feb. 26, 1924. This patent discloses a vanity case having a hinged mirror and an attached carrying strap. U.S. Design Pat. No. 85,403, which issued to R. Swanson on Oct. 20, 1931, discloses a compact provided with a wrist securement strap. U.S. Pat. No. 1,865,241, which issued to H. Dock on Jun. 28, 1932, discloses a memorandum support provided with a resilient clip for engagement with a vehicle steering wheel column. U.S. Pat. No. 1,892,721, which issued to V. Cardarelli on Jan. 3, 1933, discloses a writing pad holder provided with a pair of spaced resilient U-shaped clips for securement to radial spoke portions of a vehicle steering wheel. U.S. Pat. No. 2,141,849, which issued to H. Baer on Dec. 27, 1938, discloses a table adapted for attachment in a position overlying a vehicle steering wheel and secured to the vehicle steering column through a clamping member. U.S. Pat. No. 2,680,325, which issued to F. Berman on Jun. 8, 1954, discloses a vehicle desk provided with a clamping mechanism for securement to a vehicle steering wheel. U.S. Pat. No. 3,952,988, which issued to H. Easterly on Apr. 27, 1976, discloses a steering wheel mounted desk board adapted for securement in overlying relation on a vehicle steering wheel. U.S. Design Pat. No. 275,425, which issued to B. Briggs on Sept. 4, 1984, discloses a make up compact having a compartmentalized tray and a hinged cover which includes an interior mirror.

While the above mentioned devices are suited for their intended usage, none of these devices disclose a make up compact adapted for securement on a vehicle steering wheel including a selectively removable VELCRO fastener. Additionally, none of the aforesaid devices disclose the use of a steering wheel mounted make up compact provided with a ball and socket adjustable mounting and an electrically illuminated mirror having an adaptor cord for engagement with a vehicle cigarette lighter. Inasmuch as the art is relatively crowded with respect to these various types of make up compacts, it can be appreciated that there is a continuing need for and interest in improvements to such make up compacts, and in this respect, the present invention addresses this need and interest.

SUMMARY OF THE INVENTION

In view of the foregoing disadvantages inherent in the known types of make up compacts now present in the prior art, the present invention provides an improved steering wheel mounted make up compact. As such, the general purpose of the present invention, which will be described subsequently in greater detail, is to provide a new and improved steering wheel mounted make up compact which has all the advantages of the prior art make up compacts and none of the disadvantages.

To attain this, representative embodiments of the concepts of the present invention are illustrated in the drawings and make use of a make up compact which is removably secured by cooperating VELCRO fasteners to a resilient U-shaped spring clip adapted for removable securement to a vehicle steering wheel. Electric lights may be provided adjacent the compact mirror for connection by an adaptor cord to the vehicle cigarette lighter socket. A ball and socket pivot connection may be utilized to secure the compact for adjustment relative to the resilient spring clip. A pair of spaced spring clips may be provided to inhibit movement of the compact relative to the steering wheel.

There has thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new and improved steering wheel mounted make up compact which has all the advantages of the prior art make up compacts and none of the disadvantages.

It is another object of the present invention to provide a new and improved steering wheel mounted make up compact which may be easily and efficiently manufactured and marketed.

It is a further object of the present invention to provide a new and improved steering wheel mounted make up compact which is of a durable and reliable construction.

An even further object of the present invention is to provide a new and improved steering wheel mounted make up compact which is susceptible of a low cost of manufacture with regard to both materials and labor, and which accordingly is then susceptible of low prices of sale to the consuming public, thereby making such make up compacts economically available to the buying public.

Still yet another object of the present invention is to provide a new and improved steering wheel mounted make up compact which provides in the apparatuses and methods of the prior art some of the advantages thereof, while simultaneously overcoming some of the disadvantages normally associated therewith.

Still another object of the present invention is to provide a new and improved steering wheel mounted make up compact to enable women drivers to apply make up in a safer manner within a vehicle.

Yet another object of the present invention is to provide a new and improved steering wheel mounted make up compact which is provided with VELCRO fasteners for enabling convenient installation and removal.

Even still another object of the present invention is to provide a new and improved steering wheel mounted make up compact which utilizes VELCRO fasteners in conjunction with a ball and socket pivot mechanism and an illuminated mirror to provide a safe, convenient appliance facilitating the application of make up in a vehicle by women drivers.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
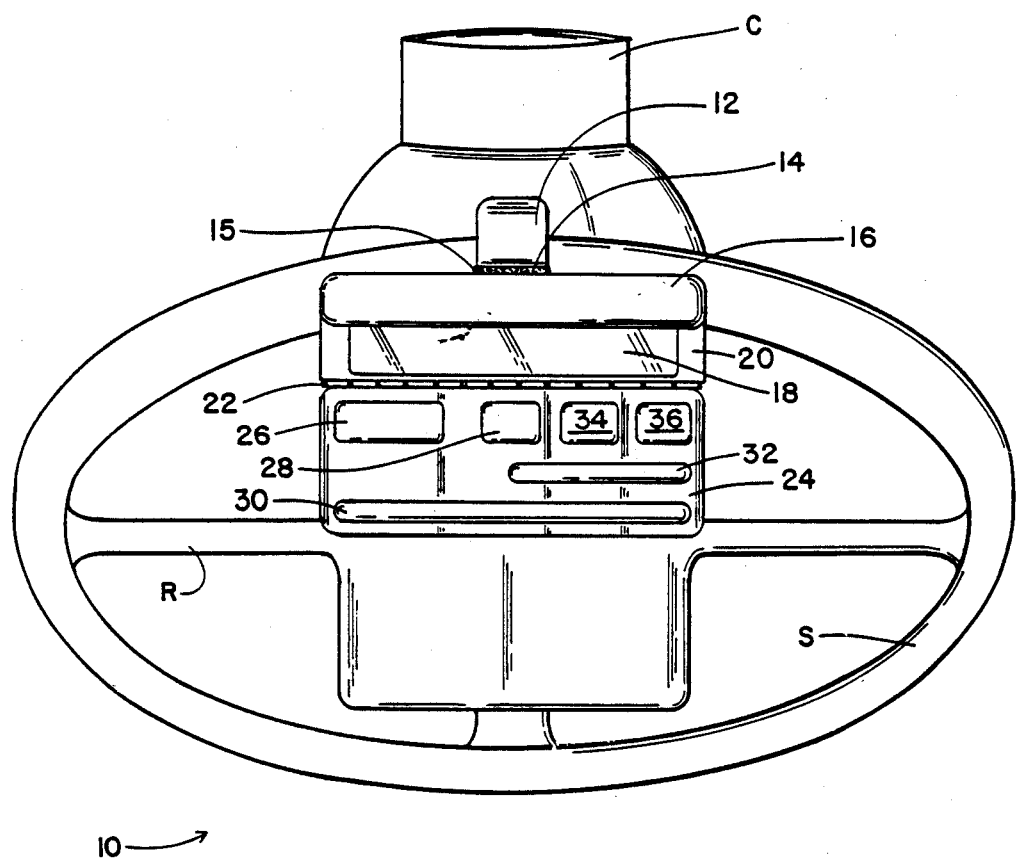
FIG. 1 is a perspective view of the steering wheel mounted make up compact according to the first embodiment of the present invention.

With reference now to the drawings, and in particular to FIG. 1 thereof, a new and improved steering wheel mounted make up compact embodying the principles and concepts of the present invention and generally designated by the reference numeral 10 will be described.

More specifically, it will be noted that the first embodiment 10 of the invention includes a U-shaped spring clip 12 formed from a strip of resilient material configured in a closed curve, having no free end edges. The spring clip 12 is secured on a back surface of a mounting plate 14, which has a front surface provided with a hook and loop type fastening strip, of the type sold under the trademark VELCRO. A generally rectangular make up case has a generally rectangular cover 16 provided with a cooperating VELCRO fastening strip 15 on a back exterior surface thereof. A mirror 18 is mounted on an interior surface of the cover 16 for display in the illustrated open position. The cover 16 has a lower portion 20 provided with a hinge 22 which mounts the cover 16 for movement between open and closed positions on a generally rectangular base 24. The base 24 is provided with a plurality of compartments 26, 28, 30, 32, 34, and 36 for storage of make up and various accessories in a conventional fashion. The make up compact 10 is adapted for securement on a top portion of a conventional vehicle steering wheel S having a plurality of conventional radially extending spokes R and supported on a conventional steering column C.

Figure 2:
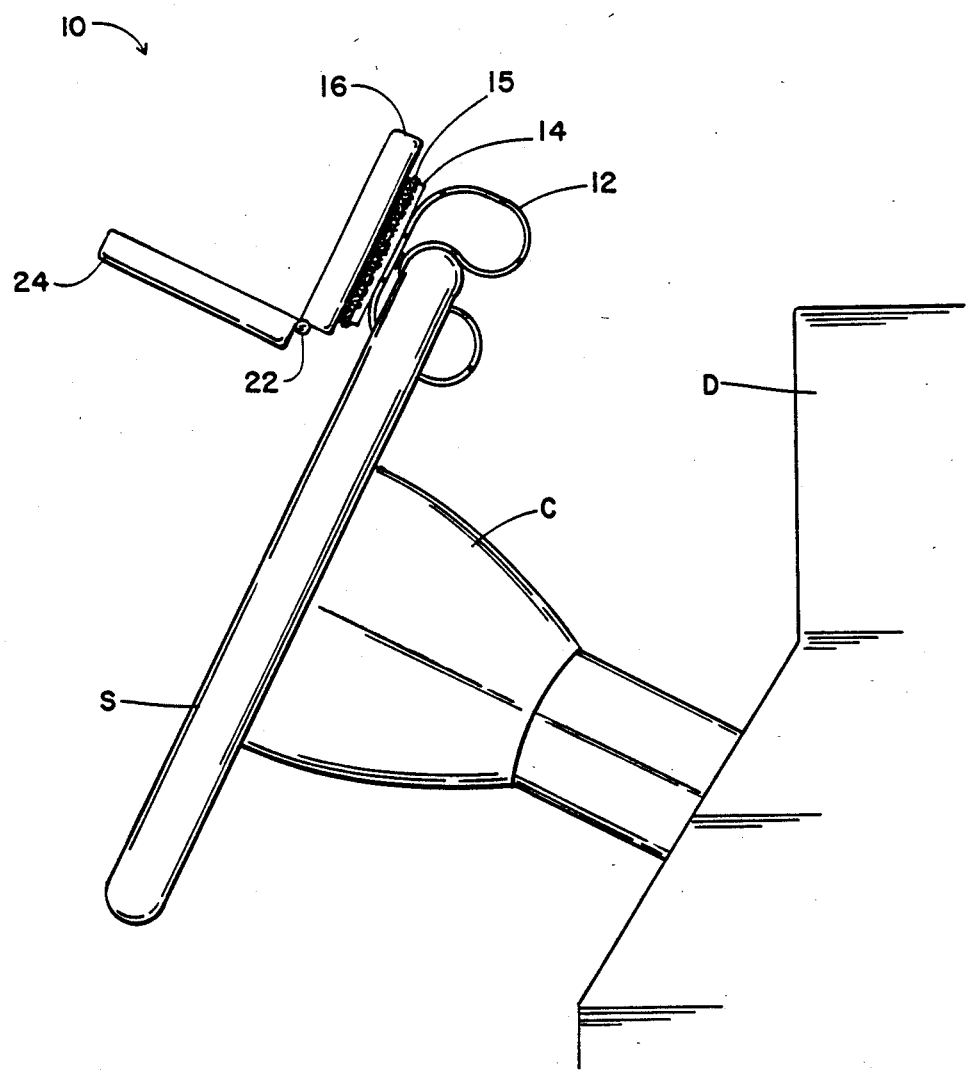
FIG. 2 is a side view of the make up compact of FIG. 1.

FIG. 2 provides a side view of the make up compact 10 according to the first embodiment of the present invention. The mounting plate 14 may be secured to the spring clip 12 by any conventional means such as threaded fasteners, rivets, adhesively or may be integrally formed therewith. The U-shaped configuration of the spring clip 12, which has a closed curve configuration with no free ends, provides a firm grip on the top portion of the steering wheel S, while presenting no free end edges to injure vehicle occupants in the event of an accident. The cooperating VELCRO fasteners on the mounting plate 14 and 15 on the back exterior surface of the cover 16 allow the make up compact 10 to be detached from the mounting plate 14 and spring clip 12 to be carried in a woman's purse. The illustrated positioning of the make up compact 10 keeps the make up compact in a woman driver's line of sight with the road. As contrasted with the conventional practice of utilizing the centrally mounted vehicle rear view mirror to apply make up, the illustrated positioning has distinct safety advantages. Additionally, because the make up compact 10 is secured to the steering wheel S, at least one of the woman's hands remains free for driving the vehicle. The make up compact 10 is supported in most vehicles at a level slightly above the dash board D of the vehicle. This allows a woman to maintain a view of the road ahead, with a minimum of effort.

Figure 3:
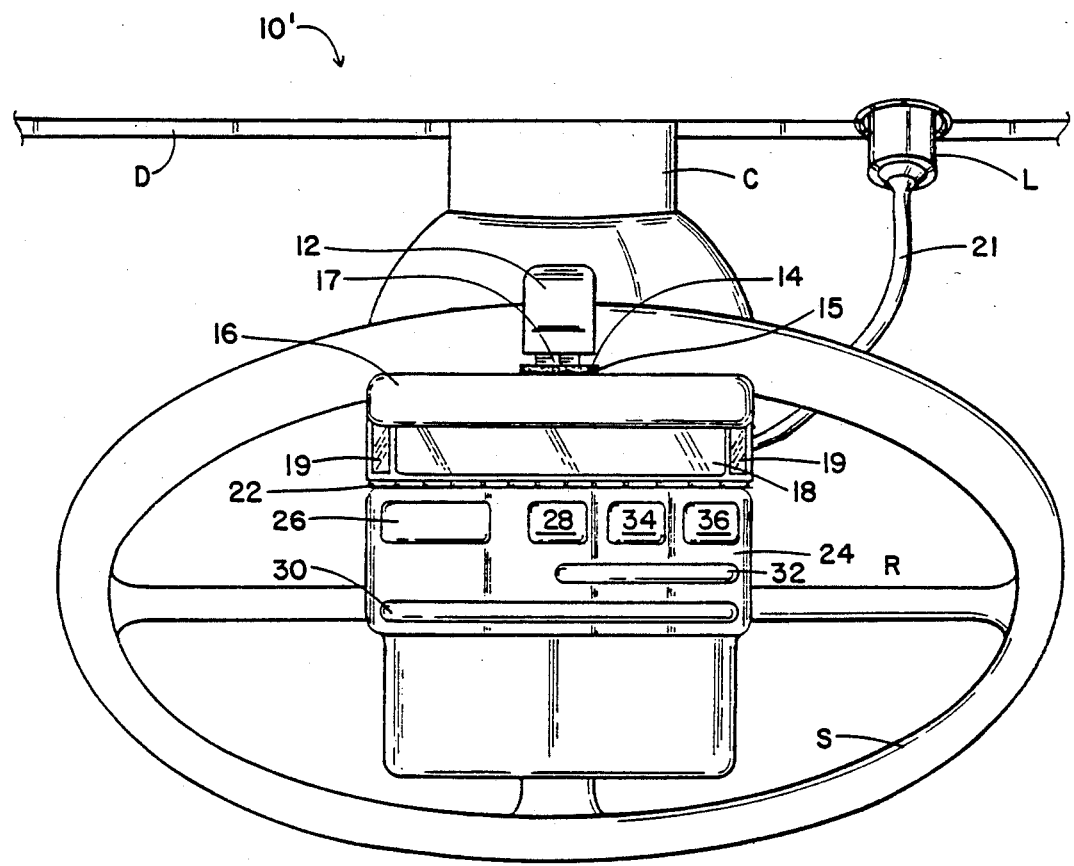
FIG. 3 is a perspective view illustrating a slightly modified make up compact according to a second embodiment of the present invention, provided with an electrically illuminated mirror and a ball and socket adjustable mounting.

FIG. 3 illustrates a slightly modified second embodiment 10' of the present invention. The same reference numerals have been utilized to identify similar parts. A ball and socket pivot mechanism 17 adjustably secures the spring clip 12 on the back surface of the mounting plate 14. This allows the make up compact to be adjustably positioned. A pair of electric lights 19 are positioned along opposite side edges of the mirror 18 and are operatively connected to an adaptor cord 21 configured for engagement in the cigarette lighter socket L of the vehicle. This allows the mirror 18 of the make up compact 10' to be illuminated to facilitate usage. The adaptor cord 21 is provided with a conventional quick release connector (not shown) to enable detachment of the body of the make up compact.

Figure 4:
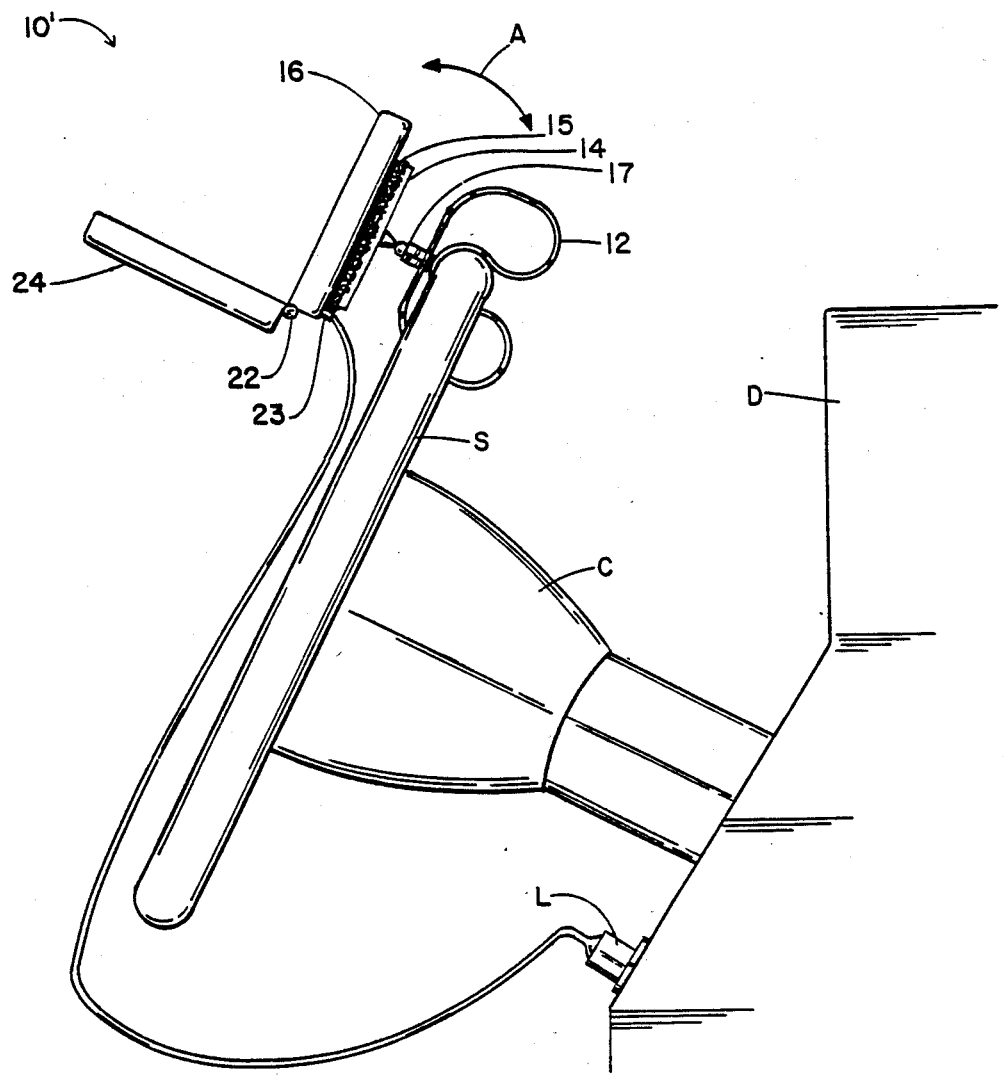
FIG. 4 is a side view of the make up compact of FIG. 3.

FIG. 4 provides a side view of the make up compact 10' according to the second embodiment of the present invention. The ball and socket pivot mounting mechanism 17 is clearly illustrated. This allows the mounting plate 14 and attached cover 16 and base 24 to be pivotally adjusted in any desired orientation to facilitate usage by differently proportioned women drivers. The adaptor cord 21 is provided with a quick release connection 23 on the back exterior surface of the cover 16. The connection 23 may be of any conventional form without departing from the scope of the present invention. As previously mentioned, this allows the cover 16 to be detached from the mounting plate 14 and from the adaptor cord 21 to allow the make up compact to be carried in a purse.

Figure 5:
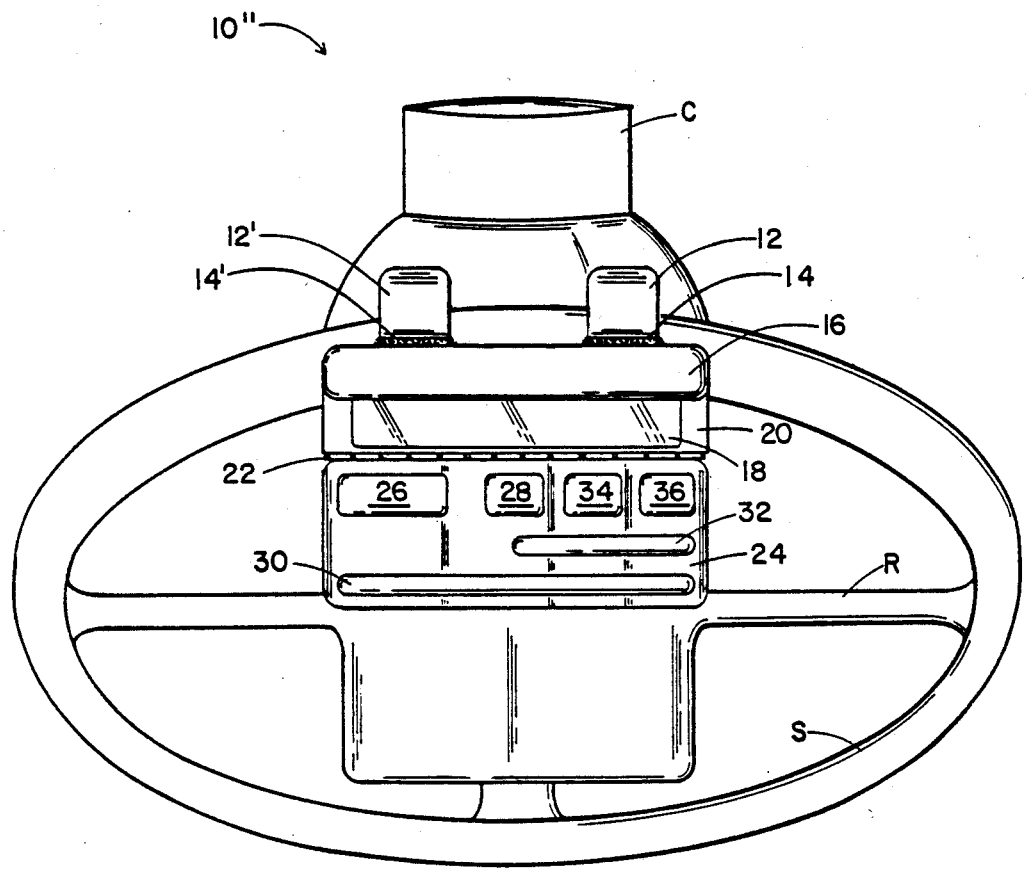
FIG. 5 is a perspective view illustrating a steering wheel mounted make up compact according to a third embodiment of the present invention, which includes a pair of spaced resilient attaching clamps.

FIG. 5 illustrates a third embodiment 10" of the present invention, similar in all respects to the first embodiment 10 of the present invention, with the exception that two spring clips 12 and 12' are secured in laterally spaced locations on the back exterior surface of the cover 16 by two spaced mounting plates 14 and 14'. The use of two spaced clips 12 and 12' provides additional stability and prevents rotation of the clamps about the steering wheel S.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A make-up compact for mounting on a steering wheel, comprising:
    a generally rectangular make-up case having a base with a plurality of compartments for reception of make-up and accessories;
    a generally rectangular cover mounted by a hinge on said base for movement between open and close positions;
    a mirror mounted on an interior surface of said cover for display in said open position;
    electric lighting means mounted adjacent said mirror on said interior surface of said cover;
    an adaptor plug for connecting said electric lighting means to a vehicle cigarette lighter socket;
    a first hook and loop type fastening strip on a back exterior surface of said cover;
    a mounting plate having opposed front and back surfaces;
    a second hook and loop type fastening strip on said front surface of said mounting plate for engagement with said first fastening strip;
    a U-shaped spring clip formed from a strip of resilient material configured in a closed curve having no free end edges, said clip dimensioned for frictional engagement with a vehicle steering wheel; and
    a ball and socket pivot mechanism adjustably securing said mounting plate to said spring clip, whereby said make-up case is mounted for compound angular adjustment, and is selectively detachable from said mounting plate to allow convenient transportation.

* * * * *